(12) United States Patent
Benhase et al.

(10) Patent No.: US 7,260,679 B2
(45) Date of Patent: Aug. 21, 2007

(54) APPARATUS AND METHOD TO MANAGE A DATA CACHE USING A FIRST AND SECOND LEAST RECENTLY USED LIST

(75) Inventors: Michael T. Benhase, Tucson, AZ (US); Binny S. Gill, San Jose, CA (US); Thomas C. Jarvis, Tucson, AZ (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/964,474

(22) Filed: Oct. 12, 2004

(65) Prior Publication Data
US 2006/0080510 A1    Apr. 13, 2006

(51) Int. Cl.
*G06F 12/12* (2006.01)
*G06F 13/00* (2006.01)

(52) U.S. Cl. .................. 711/113; 711/134; 711/136; 711/160

(58) Field of Classification Search ............... 711/133, 711/134, 136, 159, 160
See application file for complete search history.

(56) References Cited

U.S. PATENT DOCUMENTS

| | | | |
|---|---|---|---|
| 5,305,389 A | 4/1994 | Palmer | |
| 5,627,990 A | 5/1997 | Cord et al. | |
| 5,778,430 A | 7/1998 | Ish et al. | |
| 6,266,742 B1 | 7/2001 | Challenger et al. | |
| 6,347,363 B1 * | 2/2002 | Arimilli et al. | 711/150 |
| 6,457,102 B1 * | 9/2002 | Lambright et al. | 711/129 |
| 6,701,393 B1 * | 3/2004 | Kemeny et al. | 710/40 |
| 6,728,836 B1 * | 4/2004 | Lambright et al. | 711/129 |
| 6,839,809 B1 * | 1/2005 | Forster et al. | 711/134 |
| 6,898,672 B2 * | 5/2005 | Lambright et al. | 711/129 |
| 6,996,676 B2 * | 2/2006 | Megiddo et al. | 711/129 |
| 2006/0069871 A1 * | 3/2006 | Gill et al. | 711/118 |

OTHER PUBLICATIONS

IBM, "IBM TotalStorage Enterprise Storage Server: Implementing ESS Copy Servives with IBM eServer zSeries", Redbooks, SG24-5680-05, Sep. 2003, Chapters 2-8.

* cited by examiner

*Primary Examiner*—Hong Kim
(74) *Attorney, Agent, or Firm*—Chandler & Udall, LLC; Dale F. Regelman (57) ABSTRACT

A method is disclosed to manage a data cache. The method provides a data cache comprising a plurality of tracks, where each track comprises one or more segments. The method further maintains a first LRU list comprising one or more first tracks having a low reuse potential, maintains a second LRU list comprising one or more second tracks having a high reuse potential, and sets a target size for the first LRU list. The method then accesses a track, and determines if that accessed track comprises a first track. If the method determines that the accessed track comprises a first track, then the method increases the target size for said first LRU list. Alternatively, if the method determines that the accessed track comprises a second track, then the method decreases the target size for said first LRU list. The method demotes tracks from the first LRU list if its size exceeds the target size; otherwise, the method evicts tracks from the second LRU list.

42 Claims, 6 Drawing Sheets

APPARATUS AND METHOD TO MANAGE A DATA CACHE USING A FIRST AND SECOND LEAST RECENTLY USED LIST

FIELD OF THE INVENTION

This invention relates to an apparatus and method to manage a data cache.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls one or more tracks from the one or more secondary storage devices and moves those tracks to the data cache.

Thus, the system is continuously moving information to and from storage devices, and to and from the data cache. One or more device adapters interconnect the data cache and the information storage devices. What is needed is an apparatus and method to manage the tracks residing in the data cache such that tracks having a low reuse potential are preferentially demoted from the cache while tracks having a high reuse potential are preferentially kept in the cache.

SUMMARY OF THE INVENTION

Applicants' invention includes a method to manage a data cache. The method provides a data cache comprising a plurality of tracks, where each track comprises one or more segments. The method further maintains a first LRU list comprising one or more first tracks having a low reuse potential, maintains a second LRU list comprising one or more second tracks having a high reuse potential, and sets a target size for the first LRU list.

The method then accesses a track, and determines if that accessed track comprises a first track. If the method determines that the accessed track comprises a first track, then the method increases the target size for said first LRU list. Alternatively, if the method determines that the accessed track comprises a second track, then the method decreases the target size for said first LRU list.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

The invention will be described as embodied in an information storage and retrieval system which includes two clusters, a plurality of host adapters, a plurality of device adapters, and a data cache. The following description of Applicant's method to manage data in a data cache is not meant, however, to limit Applicant's invention to data processing applications, as the invention herein can be applied to data caching in a wide variety of applications including, without limitation, storage systems, databases, Web servers, middleware, processors, file systems, disk drives, RAID controllers, operating systems, and the like.

Figure 1:
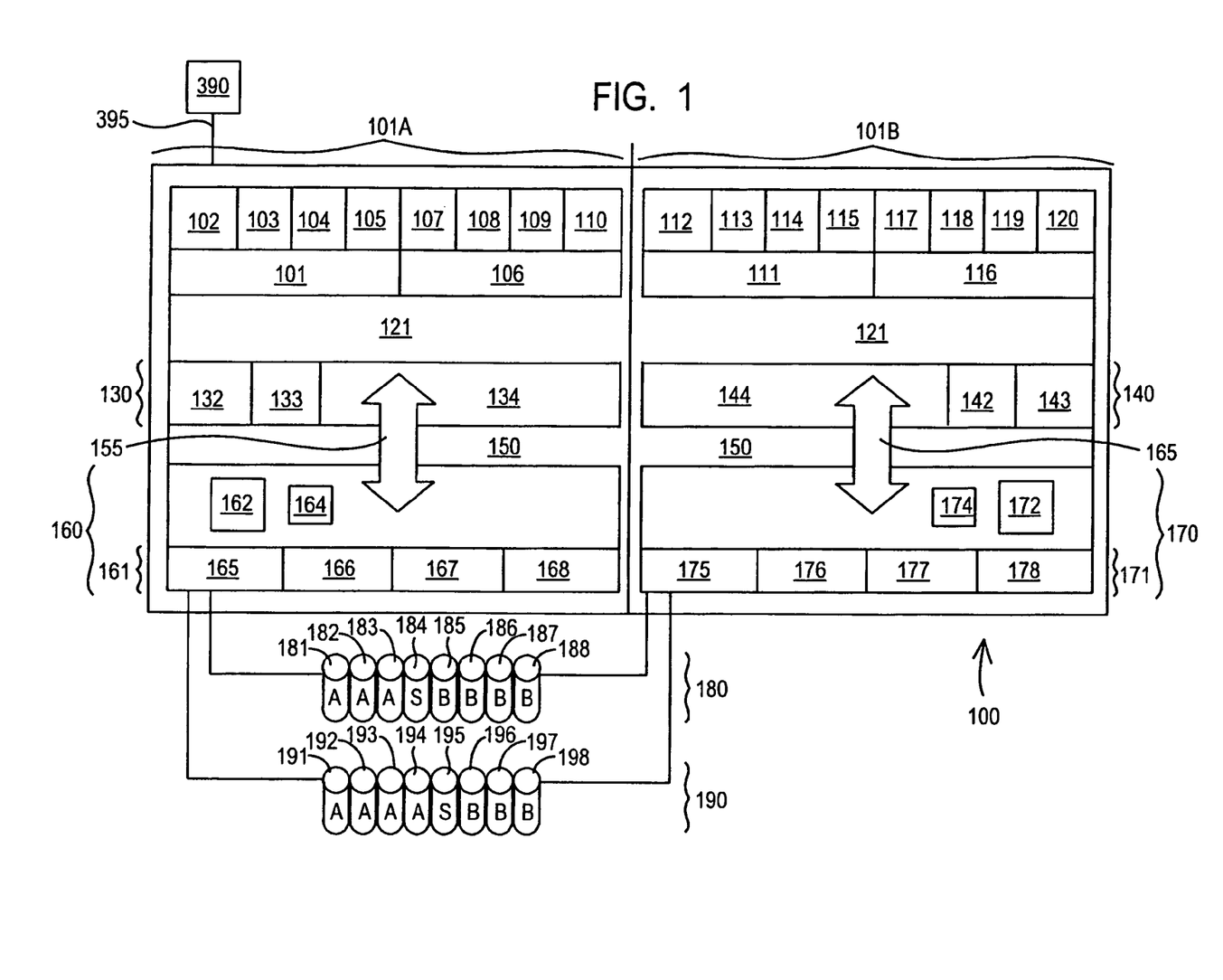
FIG. 1 is a block diagram showing the components of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group; LINUX is a registered trademark owned by Linus Torvalds.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102-105, 107-110, 112-115, and 117-120, disposed in four host bays 101, 106, 111, and 116. Each host adapter is connected to both subsystems through one or more Common Platform Interconnect buses 121 and 150 such that each subsystem can handle I/O from any host adapter. Internal buses in each subsystem are connected via a Remote I/O bridge 155/165 between the processor portions 130/140 and I/O portions 160/170, respectively.

In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 160 further comprises nonvolatile storage ("NVS") 162 and battery backup 164 for NVS 162.

I/O portion 170 comprises a plurality of device adapters, such as device adapters 175, 176, 177, and 178. I/O portion 170 further comprises NVS 172 and battery backup 174 for NVS 172.

In certain embodiments of Applicants' system, one or more host adapters 101A, processor/cache portion 130, and one or more device adapters 161, are packaged together on a single card disposed in Applicants' information storage and retrieval system. Similarly, in certain embodiments, one or more host adapters 101B, processor/cache portion 140, and one or more device adapters 171, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array 180 and array 190. The illustrated embodiment of FIG. 1 shows two storage device arrays. In other embodiments, Applicants' system includes a single storage device array. In still other embodiments, Applicants' information storage and retrieval system includes more than two storage device arrays. Each storage array appears to a host computer as one or more logical devices.

In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

Applicants' invention includes a method to manage a data cache, such as data cache 134 (FIG. 1) and/or data cache 144 (FIG. 1). Based upon actual or anticipated host computer requests, Applicants' information storage and retrieval system 100 moves tracks from the data cache to one or more RAID ranks, and from the one or more RAID ranks to the data cache.

A "stage operation" comprises moving one or more tracks from a RAID rank to the cache in response to a host request. For certain read operations, system 100 will "prestage" information, i.e. anticipate a host request.

Applicants' information storage and retrieval system monitors previous access requests, and if more than six I/Os in sequence are detected, then Applicants' method triggers sequential staging. In sequential staging, when about the middle of a staging group is read the next group starts to be staged, i.e. is "prestaged." This procedure delivers the maximum sequential throughput with no delays waiting for data to be staged from a disk.

Data written to Applicants' data storage and retrieval system by a host computer is first received by a host adapter, such as host adapter 102 (FIG. 1), and is transferred first to NVS, such as NVS 172 (FIG. 1). A copy of that data is held in the host adapter buffer. The host is notified that the I/O operation is complete as soon as the data is in NVS. The host adapter, once the NVS transfer is complete, then transfers the data to the cache. The data remains in the cache and NVS until it is "destaged." In certain embodiments, destaging is triggered by cache and NVS usage thresholds.

A destage operation includes moving tracks from cache to a RAID rank. In a synchronous destaging operation, information is destaged to one or more RAID ranks contemporaneously with transferring that information to the data cache.

In an LRU destage operation, cache space is released according to Least Recently Used algorithms. As those skilled in the art will appreciate, a Least Recently Used algorithm determines when the data tracks residing in the cache were last accessed. In certain embodiments, such an LRU algorithm includes assigning a date stamp to each track indicating when that track was last accessed. Using LRU destaging, tracks having the earliest date stamp are preferentially destaged.

Tracks that have been read sequentially are generally demoted quickly to release the used cache space because sequential data is rarely re-read within a short period of time. When destaging tracks, Applicant's information storage and retrieval system attempts to destage all the tracks that would make up a RAID stripe thereby minimizing the RAID-related activities in the device adapter.

Tracks that are brought into the cache in response to a request to read those tracks comprise tracks that have a high reuse potential. On the other hand, tracks that are prestaged in anticipation of a host request comprise tracks that have a low reuse potential. In addition, tracks that are staged/prestaged in the cache for one or more copy services comprise tracks that have a low reuse potential.

A publication entitled IBM TotalStorage Enterprise Storage Server Implementing ESS Copy Services with IBM eServer zSeries (hereinafter the "Red Book"), September 2003, describes various copy services, and is hereby incorporated by reference herein. Such copy services include, for example, peer-to-peer remote copy, sometimes referred to as PPRC (Red Book Chapters 2 and 4), Peer-to-Peer Remote Copy Extended Distance (Red Book Chapter 3), Extended Remote Copy (Red Book Chapter 5), Flash Copy (Red Book Chapters 6 and 7), and Concurrent Copy (Red Book Chapter 8).

Figure 2:
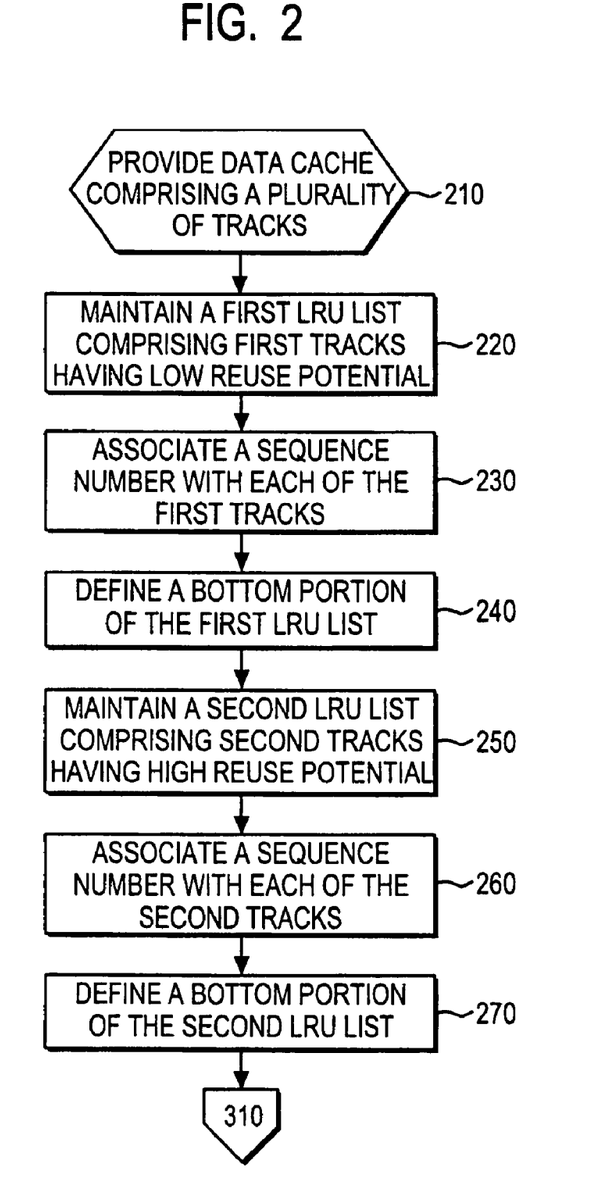
FIG. 2 is a flow chart summarizing certain initial steps in Applicants' method.

Applicants' invention includes a method to manage a data cache. Referring now to FIG. 2, in step 210 Applicants' method provides a data cache comprising a plurality of tracks. A "page" or a "segment" comprises 4 kilobytes of data. Applicants' information storage and retrieval system, such as system 100 (FIG. 1), manages data in "tracks." A track comprises a set of 4 KB segments. In certain embodiments, a track may include as many as 16 consecutive segments. At any time, some or all of those 16 segments may be present in the cache.

In step 220, Applicants' method maintains a first LRU list, where that first LRU list includes tracks having low reuse potential, i.e. first tracks. By "tracks having a low reuse potential," Applicants mean tracks prestaged in anticipation of a host request, tracks that are known to be a sequential access, and tracks that are brought into the cache for copy services.

In step 230, Applicants' method associates a first sequence number with each of the first tracks. In certain embodiments, the first sequence number associated with a first track is based upon the later of the time that the first track was brought into the cache, or last accessed from the cache, such that tracks that were recently accessed have a larger sequence number than tracks that were not recently accessed. In certain embodiments, Applicants' method maintains a sequence number, i.e. the currentSequenceNbr, that is incremented every second. In other embodiments of Applicants' method, that currentSequenceNbr is incremented every millisecond.

The first track that was most recently used is assigned the largest first sequence number, mru_first_sequenceNbr, and the first track that was least recently used is assigned the smallest first sequence number, lru_first_sequenceNbr. In certain embodiments, when a first track is placed on the first LRU list, or accessed from the cache, that first track is associated with the a sequence number determined by formula (1).

$$\text{CurrentSequenceNbr} - [\text{mru\_first\_sequenceNbr} - \text{lru\_first\_sequenceNbr}]/2 \quad (1)$$

In step 240, Applicants' method defines a bottom portion of the first LRU list. In certain embodiments, this bottom portion comprises about two percent (2%) of the number of segments comprising the cache. First tracks not included within the bottom portion of the first LRU list are included within the top portion of the first LRU list. As those skilled in the art will appreciate, each first track in the bottom portion of the first LRU list has a sequence number less than the sequence number associated with each first track not in the bottom portion.

In step 250, Applicants' method maintains a second LRU list comprising tracks, that have a high reuse potential, i.e. second tracks. By "tracks that have a high reuse potential," Applicants mean tracks that are not prestaged in anticipation of a host request, tracks that are not known to be a sequential access, and tracks that are not brought into the cache for copy services.

In step 260, Applicants' method associates a second sequence number with each of the second tracks. In certain embodiments, the second sequence number associated with a second track is based upon the later of the time that the second track was brought into the cache, or last accessed from the cache, such that tracks that were recently accessed have a larger sequence number than tracks that were not recently accessed.

The second track that was most recently used is assigned the largest first sequence number, mru_second_sequenceNbr, and the second track that was least recently used is assigned the smallest first sequence number, lru_second_sequenceNbr. In certain embodiments, when a second track is placed on the second LRU list, or accessed from the cache, that second track is associated with a sequence number equal to the CurrentSequenceNbr.

In step 270, Applicants' method defines a bottom portion of the second LRU list. In certain embodiments, this bottom portion comprises about two percent (2%) of number of segments comprising the cache. Second tracks not included within the bottom portion of the second LRU list are included within the top portion of the second LRU list. As those skilled in the art will appreciate, each second track in the bottom portion of the second LRU list has a sequence number less than the sequence number associated with each second track not in the bottom portion.

Figure 3:
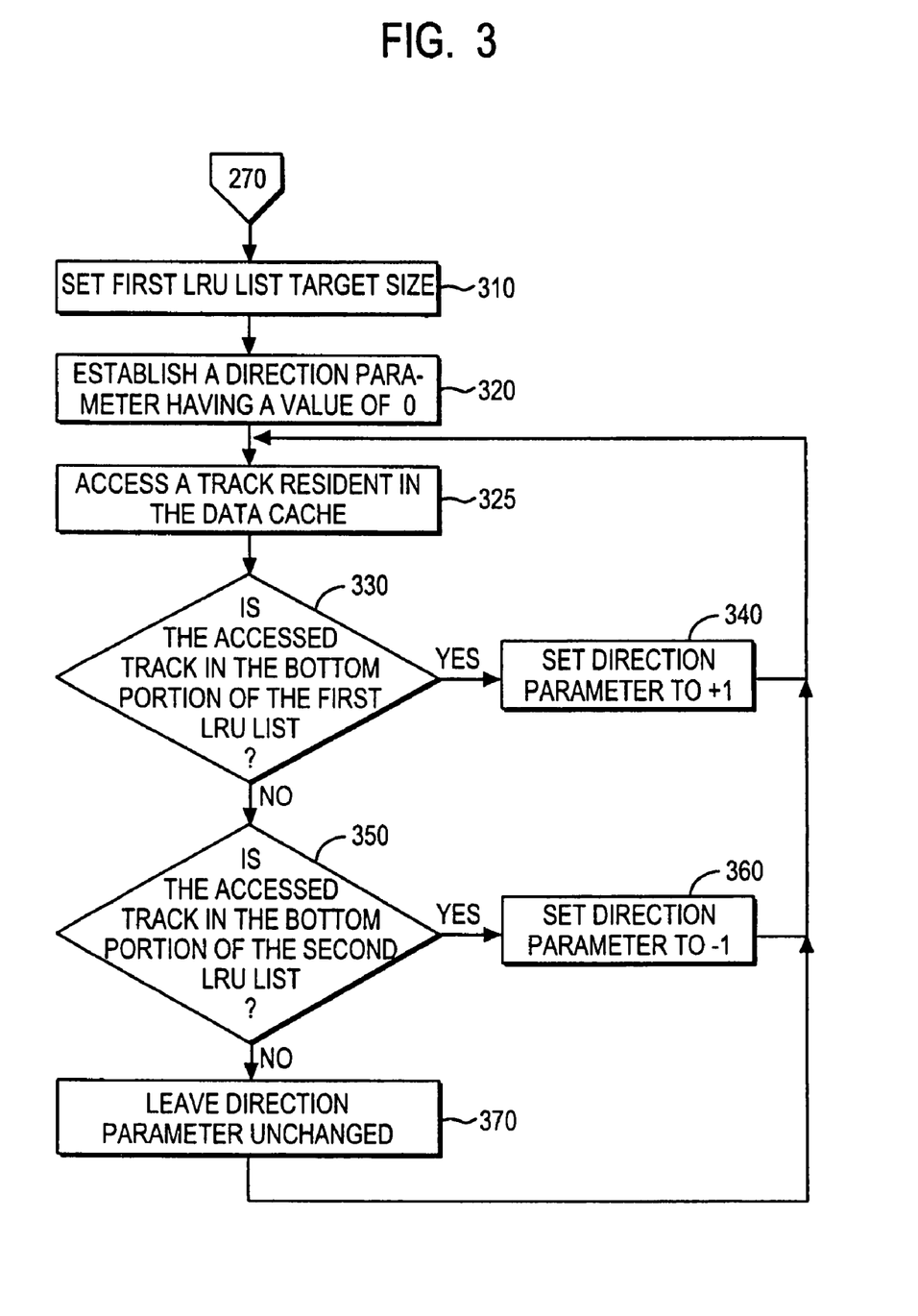
FIG. 3 is a flow chart summarizing certain additional steps in Applicants' method.

Applicants' method transitions from step 270 to step 310 (FIG. 3). In step 310, Applicants' method sets a first LRU list target size. In certain embodiments, step 310 is performed by a processor, such as processor 132 (FIG. 1), disposed in Applicants' information storage and retrieval system, such as system 100 (FIG. 1). Step 310 includes determining if the sum of the number of segments comprising the first LRU list and the second LRU list exceeds a predetermined number, i.e. exceeds a fixed_predetermined_number. In certain embodiments, that fixed_predetermined_number is set to equal 90 percent of the maximum number of segments that the cache can hold.

Step 310 further includes determining if any tracks have been demoted from the cache. If Applicants' method determines in step 310 that the aggregate number of segments comprising the first LRU list and the second LRU list exceed the fixed_predetermined_number, and if Applicants' method further determines that no tracks have been demoted from the cache, then Applicants' method sets the first LRU list target size to equal the number of segments comprising the first LRU list.

As is described in greater detail below, Applicants' method autonomically adjusts this first LRU list target size based upon actual utilization of the tracks in the cache. When a first track in the bottom portion of the first LRU list is accessed from the cache, Applicants' method increases the first LRU list target size. On the other hand, when a second track in the bottom portion of the second LRU list is accessed from the cache, Applicants' method decreases the first LRU list target size.

In step 320, Applicants' method establishes a direction parameter, and sets that direction parameter to 0. Step 320 may be performed any time prior to executing step 340 or step 360. In certain embodiments, step 320 is performed by a processor, such as processor 132 (FIG. 1), disposed in Applicants' information storage and retrieval system, such as system 100 (FIG. 1).

In step 325, a track is accessed from the cache. Applicants' method transitions from step 325 to step 330 wherein the method determines if the accessed track comprises a first track in the bottom portion of the first LRU list. In certain embodiments, step 330 is performed by a processor, such as processor 132 (FIG. 1), disposed in Applicants' information storage and retrieval system, such as system 100 (FIG. 1).

If Applicants' method determines in step 330 that the accessed track of step 320 comprises a first track in the bottom portion of the first LRU list, then the method transitions from step 330 to step 340 wherein the method sets the direction parameter to a value of +1. In certain embodiments, step 340 is performed by a processor, such as processor 132 (FIG. 1), disposed in Applicants' information storage and retrieval system, such as system 100 (FIG. 1). Applicants' method transitions from step 340 to step 325 and continues as described herein.

If Applicants' method determines in step 330 that the accessed track of step 320 does not comprise a first track in the bottom portion of the first LRU list, then the method transitions from step 330 to step 350 wherein the method determines if the accessed track of step 320 comprises a second track in the bottom portion of the second LRU list. In certain embodiments, step 350 is performed by a processor, such as processor 132 (FIG. 1), disposed in Applicants' information storage and retrieval system, such as system 100 (FIG. 1).

If Applicants' method determines in step 350 that the accessed track of step 320 comprises a second track in the bottom portion of the second LRU list, then the method transitions from step 350 to step 360 wherein the method sets the direction parameter to a value of −1. In certain embodiments, step 360 is performed by a processor, such as processor 132 (FIG. 1), disposed in Applicants' information storage and retrieval system, such as system 100 (FIG. 1).

Applicants' method transitions from step 360 to step 325 and continues as described herein.

If Applicants' method determines in step 350 that the accessed track of step 320 does not comprise a second track in the bottom portion of the second LRU list, then the method transitions from step 350 to step 370 wherein the method leaves the direction parameter unchanged. Applicants' method transitions from step 370 to step 325 and continues as described herein.

Figure 4:
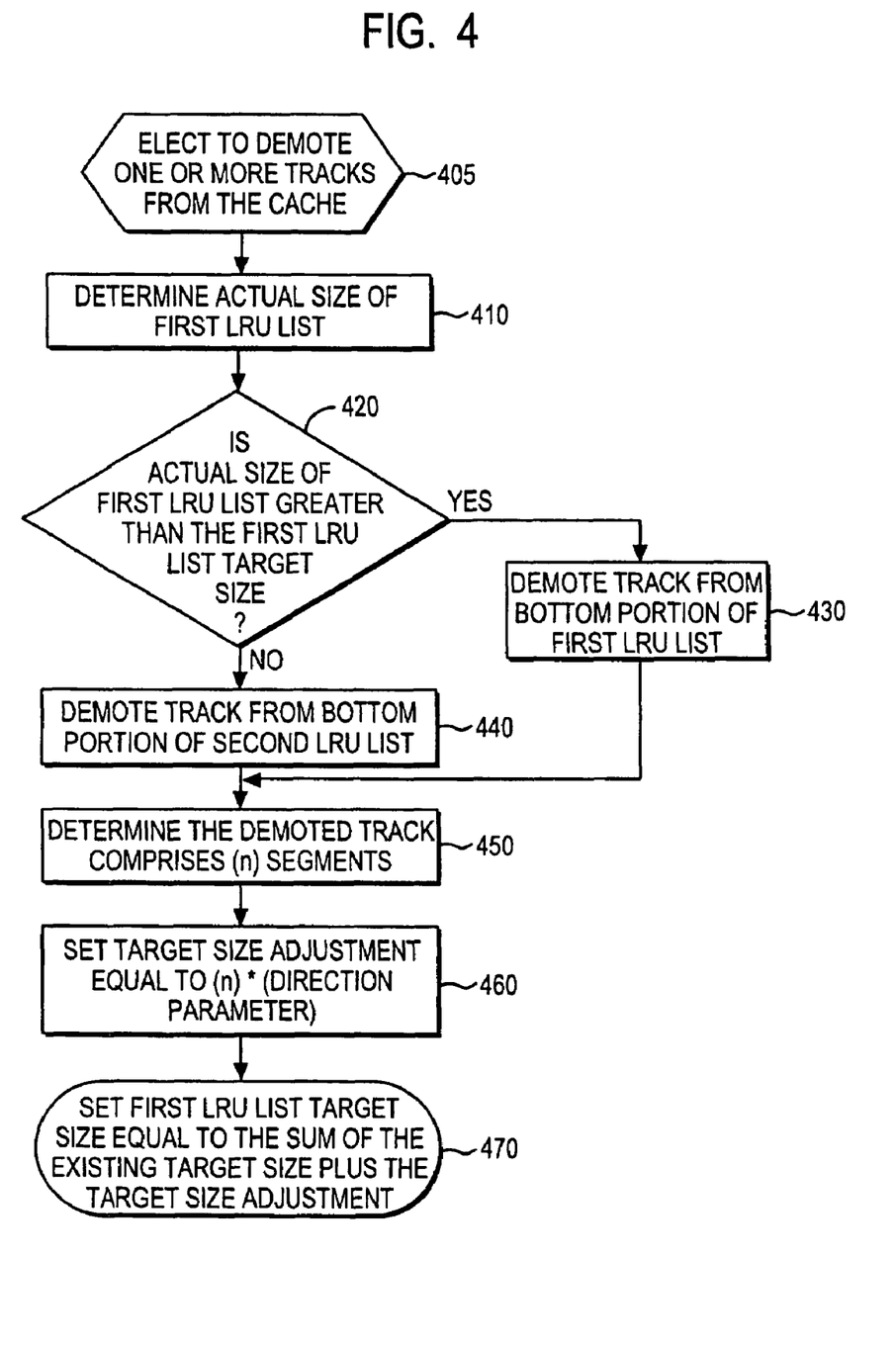
FIG. 4 is a flow chart summarizing certain additional steps in Applicants' method.

Referring now to FIG. 4, in step 405 Applicants' method elects to demote one or more tracks from the cache. Applicants' method transitions from step 405 to step 410 wherein the method determines the actual size of the first LRU list. In certain embodiments, step 410 is performed by a processor, such as processor 132 (FIG. 1), disposed in Applicants' information storage and retrieval system, such as system 100 (FIG. 1).

Applicants' method transitions from step 410 to step 420 wherein the method determines if the actual size of the first LRU list is greater than the first LRU list target size. In certain embodiments, step 420 is performed by a processor, such as processor 132 (FIG. 1), disposed in Applicants' information storage and retrieval system, such as system 100 (FIG. 1).

If Applicants' method determines in step 420 that the actual size of the first LRU list is greater than the first LRU list target size, then the method transitions from step 420 to step 430 wherein the method demotes one or more first tracks from the bottom portion of the first LRU list. In certain embodiments, step 430 is performed by a processor, such as processor 132 (FIG. 1), disposed in Applicants' information storage and retrieval system, such as system 100 (FIG. 1). Applicants' method transitions from step 430 to step 450.

If Applicants' method determines in step 420 that the actual size of the first LRU list is not greater than the first LRU list target size, then the method transitions from step 420 to step 440 wherein the method demotes one or more second tracks from the bottom portion of the second LRU list. In certain embodiments, step 440 is performed by a processor, such as processor 132 (FIG. 1), disposed in Applicants' information storage and retrieval system, such as system 100 (FIG. 1).

Applicants' method transitions from step 440 to step 450, wherein the method determines the number (n) of segments comprising the demoted one or more tracks of either step 430 or 440. In certain embodiments, step 450 is performed by a processor, such as processor 132 (FIG. 1), disposed in Applicants' information storage and retrieval system, such as system 100 (FIG. 1).

Applicants' method transitions from step 450 to step 460 wherein the method calculates a first LRU list target size adjustment, wherein that adjustment comprises the multiplication product of (n), i.e. the number of segments comprising the one or more demoted tracks, and the direction parameter set in step 340, or in step 360, or in step 370. In certain embodiments, step 460 is performed by a processor, such as processor 132 (FIG. 1), disposed in Applicants' information storage and retrieval system, such as system 100 (FIG. 1).

Applicants' method transitions from step 460 to step 470 wherein the method calculates an adjusted first LRU list target size by adding the first LRU target size adjustment of step 460 to the existing first LRU list target size. In certain embodiments, step 470 is performed by a processor, such as processor 132 (FIG. 1), disposed in Applicants' information storage and retrieval system, such as system 100 (FIG. 1).

The following examples are presented to further illustrate to persons skilled in the art how to make and use the invention. These examples are not intended as a limitation, however, upon the scope of the invention, which is defined only by the appended claims.

EXAMPLE 1

As a first example, if Applicants' method determines in step 330 that the track accessed in step 320 comprises a first track in the bottom portion of the first LRU list, then Applicants' method sets the direction parameter to +1 in step 340. If Applicants' method demotes one or more tracks in step 430 or 440, and determines in step 450 that the demoted tracks comprise 10 segments, then in step 460 Applicants' method calculates a target size adjustment of +10. Applicants' method in step 470 increases the first LRU list target size by 10.

EXAMPLE 2

As a second example, if Applicants' method determines in step 350 that the track accessed in step 320 comprises a second track in the bottom portion of the second LRU list, then Applicants' method sets the direction parameter to −1 in step 360. If Applicants' method demotes one or more tracks in step 430 or 440, and determines in step 450 that the demoted tracks comprise 10 segments, then in step 460 Applicants' method calculates a target size adjustment of −10. Applicants' method in step 470 decreases the first LRU list target size by 10.

EXAMPLE 3

As a third example, if Applicants' method determines that the track accessed in step 320 comprises neither a first track in the bottom portion of the first LRU list nor a second track in the bottom portion of the second LRU list, then Applicants' method leaves the direction parameter unchanged in step 370. If Applicants' method demotes one or more tracks in step 430 or 440, and determines in step 450 that the demoted tracks comprise 10 segments, then in step 460 Applicants' method calculates a target size adjustment of −10 or +10 depending upon the value of the direction parameter. Applicants' method in step 470 then decreases or increases the first LRU list target size by −10 or +10, respectively, depending on the value of the direction parameter.

Figure 5:
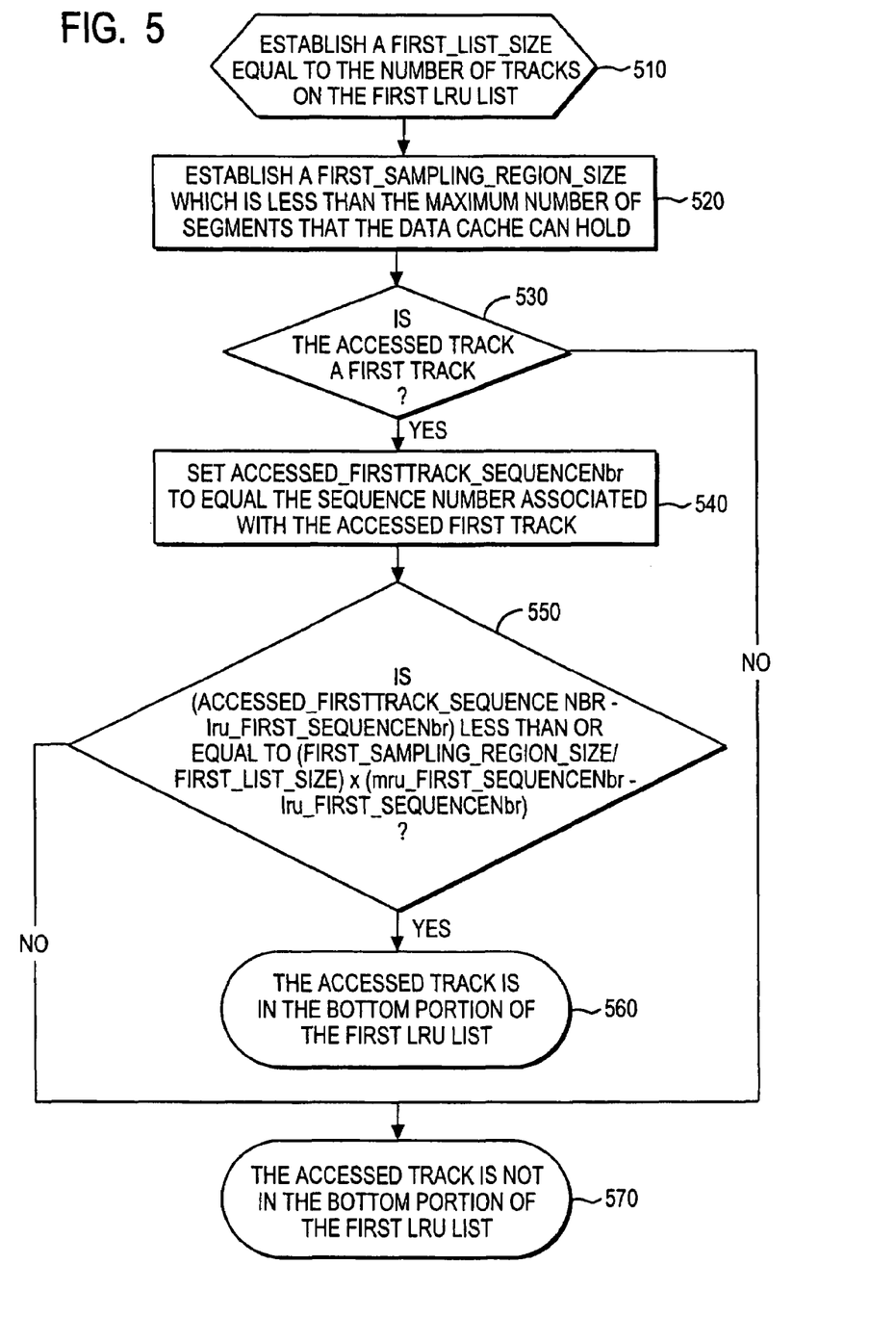
FIG. 5 is a flow chart summarizing certain additional steps in Applicants' method.

In certain embodiments, step 330, which determines if an accessed track comprises a first track in the bottom portion of the first LRU list, includes the steps set forth in FIG. 5. Referring now to FIG. 5, in step 510 Applicants' method establishes a first_list_Size equal to the number of tracks on the first LRU list. In certain embodiments, step 510 is performed by a processor, such as processor 132 (FIG. 1), disposed in Applicants' information storage and retrieval system, such as system 100 (FIG. 1).

In step 520, Applicants' method establishes a first_sampling_region_size which is less than the maximum number of segments that the cache can hold. In certain embodiments, step 520 is performed by a processor, such as processor 132 (FIG. 1), disposed in Applicants' information storage and retrieval system, such as system 100 (FIG. 1).

In step 530, Applicants' method determines if the accessed track comprises a first track. In certain embodiments, step 530 is performed by a processor, such as processor 132 (FIG. 1), disposed in Applicants' information storage and retrieval system, such as system 100 (FIG. 1).

If Applicants' method determines in step 530 that the accessed track is not a first track, then the method transitions from step 530 to step 570 wherein the method determines that the accessed track is not a first track in the bottom portion of the first LRU list. In certain embodiments, step 570 is performed by a processor, such as processor 132 (FIG. 1), disposed in Applicants' information storage and retrieval system, such as system 100 (FIG. 1).

If Applicants' method determines in step 530 that the accessed track is a first track, then the method transitions from step 530 to step 540 wherein the method sets accessed_firsttrack_sequenceNbr equal to the sequence number associated with the accessed first track. In certain embodiments, step 540 is performed by a processor, such as processor 132 (FIG. 1), disposed in Applicants' information storage and retrieval system, such as system 100 (FIG. 1).

In step 550, Applicants' method determines if the value of the difference (accessed_firstrack_sequenceNBR−lru_first_sequenceNbr) is less than or equal to the value of:

(first_sampling_region_size/first_list_Size)×(mru_first_sequenceNbr−lru_first_sequenceNbr).

In certain embodiments, step 550 is performed by a processor, such as processor 132 (FIG. 1), disposed in Applicants' information storage and retrieval system, such as system 100 (FIG. 1).

If Applicants' method determines in step 550 that the value of the difference (accessed_firstrack_sequenceNBR−lru_first_sequenceNbr) is less than or equal to the value of:

(first_sampling_region_size/first_list_Size)×(mru_first_sequenceNbr−lru_first_sequenceNbr), then the method transitions to step 560 wherein the method determines that the accessed track of step 320 comprises a first track in the bottom portion of the first LRU list. In certain embodiments, step 560 is performed by a processor, such as processor 132 (FIG. 1), disposed in Applicants' information storage and retrieval system, such as system 100 (FIG. 1).

If Applicants' method determines in step 550 that the value of the difference (accessed_firstrack_sequenceNBR−lru_first_sequenceNbr) is not less than or equal to the value of:

(first_sampling_region_size/first_list_Size)×(mru_first_sequenceNbr−lru_first_sequenceNbr), then the method transitions to step 570 wherein the method determines that the accessed track of step 320 does not comprise a first track in the bottom portion of the first LRU list.

Figure 6:
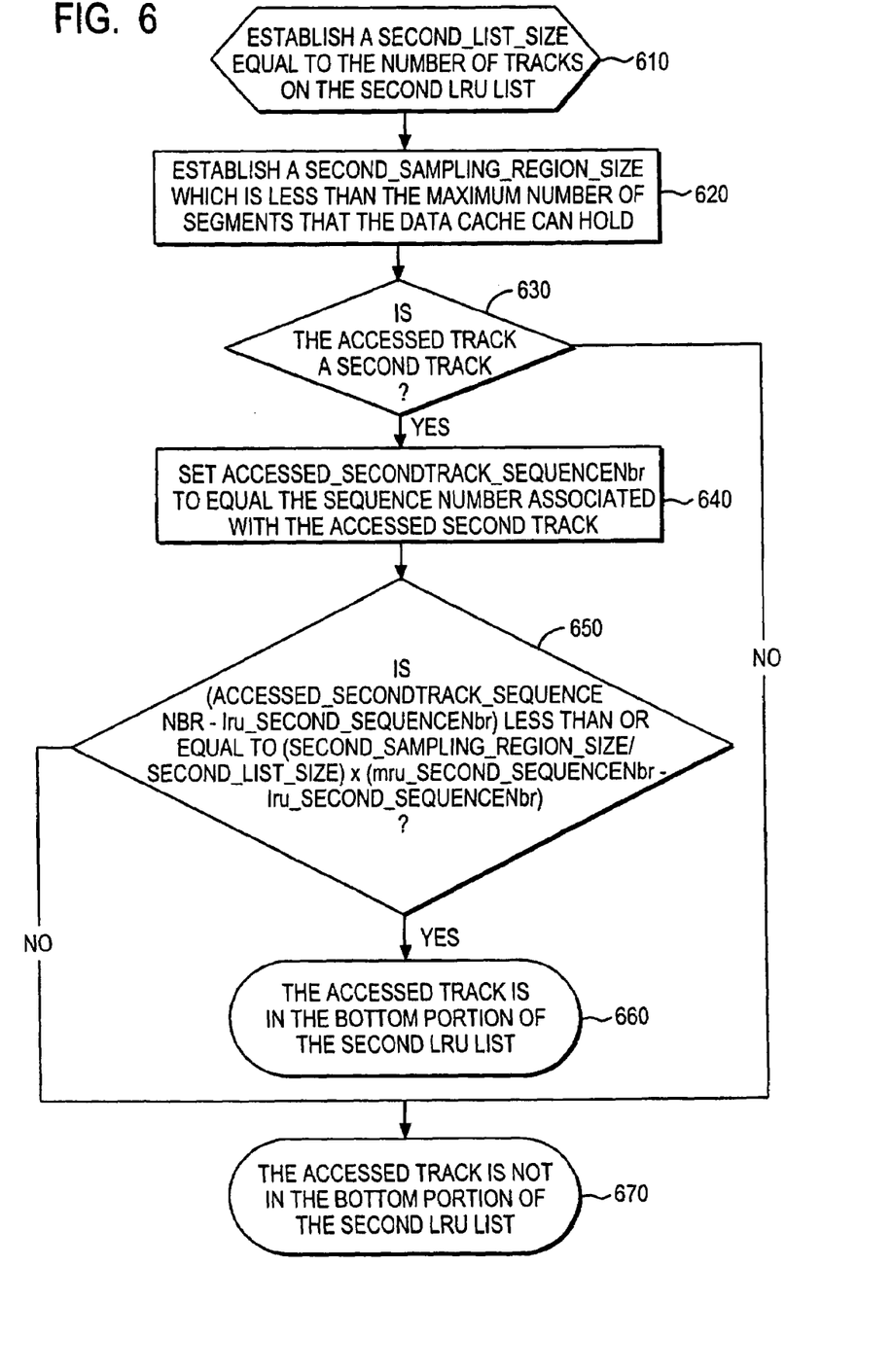
FIG. 6 is a flow chart summarizing certain additional steps in Applicants' method.

In certain embodiments, step 350, which determines if an accessed track comprises a second track in the bottom portion of the second LRU list, includes the steps set forth in FIG. 6. Referring now to FIG. 6, in step 610 Applicants' method establishes a second_list_Size equal to the number of tracks on the second LRU list. In certain embodiments, step 610 is performed by a processor, such as processor 132 (FIG. 1), disposed in Applicants' information storage and retrieval system, such as system 100 (FIG. 1).

In step 620, Applicants' method establishes a second_sampling_region_size which is less than the maximum number of segments that the cache can hold. In certain embodiments, step 620 is performed by a processor, such as processor 132 (FIG. 1), disposed in Applicants' information storage and retrieval system, such as system 100 (FIG. 1).

In step 630, Applicants' method determines if the accessed track comprises a second track. In certain embodiments, step 630 is performed by a processor, such as processor 132 (FIG. 1), disposed in Applicants' information storage and retrieval system, such as system 100 (FIG. 1).

If Applicants' method determines in step 630 that the accessed track is not a second track, then the method transitions from step 630 to step 670 wherein the method determines that the accessed track is not a second track in the bottom portion of the second LRU list. In certain embodiments, step 670 is performed by a processor, such as processor 132 (FIG. 1), disposed in Applicants' information storage and retrieval system, such as system 100 (FIG. 1).

If Applicants' method determines in step 630 that the accessed track is a second track, then the method transitions from step 630 to step 640 wherein the method sets accessed_secondtrack_sequenceNbr equal to the sequence number associated with the accessed second track. In certain embodiments, step 640 is performed by a processor, such as processor 132 (FIG. 1), disposed in Applicants' information storage and retrieval system, such as system 100 (FIG. 1).

In step 650, Applicants' method determines if the value of the difference (accessed_secondrack_sequenceNBR−lru_second_sequenceNbr) is less than or equal to the value of:

(second_sampling_region_size/second_list_Size)×(mru_second_sequenceNbr−lru_second_sequenceNbr).

In certain embodiments, step 650 is performed by a processor, such as processor 132 (FIG. 1), disposed in Applicants' information storage and retrieval system, such as system 100 (FIG. 1).

If Applicants' method determines in step 650 that the value of the difference (accessed_secondrack_sequenceNBR−lru_second_sequenceNbr) is less than or equal to the value of:

(second_sampling_region_size/second_list_Size)×(mru_second_sequenceNbr−lru_second_sequenceNbr), then the method transitions to step 660 wherein the method determines that the accessed track of step 320 comprises a second track in the bottom portion of the second LRU list. In certain embodiments, step 660 is performed by a processor, such as processor 132 (FIG. 1), disposed in Applicants' information storage and retrieval system, such as system 100 (FIG. 1).

If Applicants' method determines in step 650 that the value of the difference (accessed_secondrack_sequenceNBR−lru_second_sequenceNbr) is not less than or equal to the value of:

(second_sampling_region_size/second_list_Size)×(mru_second_sequenceNbr−lru_second_sequenceNbr), then the method transitions to step 670 wherein the method determines that the accessed track of step 320 does not comprise a second track in the bottom portion of the second LRU list.

The embodiments of Applicants' method recited in FIG. 5 or 6 may be implemented separately. Moreover, in certain embodiments, individual steps recited in FIGS. 2 and/or 3 and/or 4 and/or 5 and/or 6 may be combined, eliminated, or reordered.

In certain embodiments, Applicants' invention includes instructions residing in the memory, such as memory 133 (FIG. 1) and/or memory 143 (FIG. 1), where those instructions are executed by system processor 132 (FIG. 1) and/or processor 142 (FIG. 1), to performs steps 220, 230, 240, 250, 260, 270, recited in FIG. 2, and/or steps 310, 320, 330, 340, 350, 360, 370, and/or 380, recited in FIG. 3, and/or to steps 410, 420, 430, 440, 450, 460, and/or 470, recited in FIG. 4, and/or steps 510, 520, 530, 540, 550, 560, and/or 570, recited in FIG. 5, and/or steps 610, 620, 630, 640, 650, 660, and/or 670, recited in FIG. 6.

In other embodiments, Applicants' invention includes instructions residing in any other computer program product, where those instructions are executed by a computer external to, or internal to, system 100, to perform steps 220, 230, 240, 250, 260, 270, recited in FIG. 2, and/or steps 310, 320, 330, 340, 350, 360, 370, and/or 380, recited in FIG. 3, and/or to steps 410, 420, 430, 440, 450, 460, and/or 470, recited in FIG. 4, and/or steps 510, 520, 530, 540, 550, 560, and/or 570, recited in FIG. 5, and/or steps 610, 620, 630, 640, 650, 660, and/or 670, recited in FIG. 6. In either case, the instructions may be encoded in an information storage medium comprising, for example, a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to manage data stored in a data cache, comprising the steps of:
   providing a data cache comprising a plurality of tracks, wherein each track comprises one or more segments, and wherein said cache is capable of storing a maximum number of segments;
   maintaining a first least recently used ("LRU") list comprising one or more first tracks having a low reuse potential;
   maintaining a second LRU list comprising one or more second tracks having a high reuse potential;
   setting a target size for said first LRU list;
   accessing a track;
   determining if said accessed track comprises a first track;
   operative if said accessed track comprises a first track, increasing said target size for said first LRU list;
   operative if said accessed track comprises a second track, decreasing said target size for said first LRU list.

2. The method of claim 1, further comprising the steps of:
   determining the actual size of said first LRU list;
   providing a fixed_predetermined_number;
   determining if the sum of the number of segments comprising said first LRU list and comprising said second LRU list exceeds said fixed_predetermined_number;
   determining if one or more tracks have been demoted from the cache;
   operative if the sum of the number of segments in said first LRU list and said second LRU list exceed said fixed_predetermined_number, and operative if one or more tracks have not been demoted from the cache, setting said target size of said first list to equal the number of segments comprising said first LRU list;
   operative if the sum of the number of segments in said first LRU list and said second LRU list exceed said fixed_predetermined_number, electing to demote one or more tracks from said cache;
   determining if said actual size of said first LRU list is greater than said target size of said first LRU list;
   operative if electing to demote one or more tracks from said cache, and operative if said actual size of said first LRU list is greater than said target size of said first LRU list, demoting one or more tracks from said first LRU list;
   operative if electing to demote one or more tracks from said cache, and operative if said actual size of said first LRU list is not greater than said first LRU list target size, demoting one or more tracks from said second LRU list.

3. The method of claim 2, further comprising the step of setting said fixed_predetermined_number equal to about 90 percent of said maximum number of segments.

4. The method of claim 2, further comprising the steps of:
   associating a first sequence number to each of said first tracks, wherein each such first sequence number is based upon the time the associated first track was last accessed, wherein the least recently accessed first track is associated with the smallest first sequence number lru_first_sequenceNbr, and wherein the most recently accessed first track is associated with the largest first sequence number mru_first_sequenceNbr;
   associating a second sequence number to each of said second tracks, wherein each such second sequence number is based upon the time the associated second track was last accessed, wherein the least recently accessed second track is associated with the smallest second sequence number lru_second_sequenceNbr, and wherein the most recently accessed second track is associated with the largest second sequence number mru_second_sequenceNbr.

5. The method of claim 4, further comprising the steps of:
   defining a bottom portion of said first LRU list and a top portion of said first LRU list, wherein each first track comprising said bottom portion of said first LRU list is associated with a first sequence number less than the first sequence number associated with each first track comprising said top portion of said first LRU list;
   operative if said actual size of said first LRU list is greater than said target size of said first LRU list, demoting one or more first tracks from said bottom portion of said first LRU list.

6. The method of claim 5, further comprising the step of setting said bottom portion of said first LRU list to comprise a number of segments equal to about 2 percent of said maximum number of segments.

7. The method of claim 5, further comprising the steps of:
   defining a bottom portion of said second LRU list and a top portion of said second LRU list, wherein each second track comprising said bottom portion of said second LRU list is associated with a second sequence number less than the second sequence number associated with each second track comprising said top portion of said second LRU list;
   operative if said actual size of said first LRU list is not greater than said target size of said first LRU list, demoting one or more second tracks from said bottom portion of said second LRU list.

8. The method of claim 7, further comprising the step of setting said bottom portion of said second LRU list to comprise a number of segments equal to about 2 percent of said maximum number of segments.

9. The method of claim 7, further comprising the steps of:
establishing a direction parameter with a value of 0;
operative if a track comprising said bottom portion of said first LRU list is accessed, setting said direction parameter to equal +1;
operative if a track comprising said bottom portion of said second LRU list is accessed, setting said direction parameter to equal −1;
demoting a track from said cache;
determining the number of segments comprising said demoted track;
forming an adjustment number comprising the multiplication product of said direction parameter and the number of segments comprising the demoted track;
adjusting said target size of said first LRU list to equal said target size plus said adjustment number.

10. The method of claim 9, wherein said setting a direction parameter step further comprises the steps of:
establishing a first_list_Size equal to the number of segments on said first LRU list;
establishing a first_sampling_region_size which is less than said maximum number of segments;
operative if said accessed track comprises a first track, setting accessed_firsttrack_sequenceNbr to equal the sequence number associated with the accessed first track;
operative if (accessed_firstrack_sequenceNBR−lru_first_sequenceNbr)≦(first_sampling_region_size/first_ list_Size)×(mru_first_sequenceNbr−lru_first_sequenceNbr), setting said direction parameter to equal +1.

11. The method of claim 10, further comprising the steps of:
setting cacheSize equal to said maximum number of segments;
setting said first_sampling_region_size equal to cacheSize/50.

12. The method of claim 10, further comprising the steps of:
establishing a second_list_Size equal to the number of segments on said second LRU list;
establishing a second_sampling_region_size which is less than said maximum number of segments;
operative if said accessed track comprises a second track, determining the second sequence number associated with that accessed second track;
setting accessed_secondtrack_sequenceNbr to equal the sequence number associated with the accessed second track;
operative if (accessed_secondrack_sequenceNBR−lru_second_sequenceNbr)≦(second_sampling_region_size/second_list_Size)×(mru_second_sequenceNbr−lru_second_sequenceNbr), setting said direction parameter to equal −1.

13. The method of claim 12, further comprising the steps of:
setting cacheSize equal to said maximum number of segments;
setting said second_sampling_region_size equal to cacheSize/50.

14. The method of claim 12, wherein said first_sampling_region_size is equal to said second_sampling_region_size.

15. An article of manufacture comprising a data cache and a computer useable medium having computer readable program code disposed therein to manage data in said data cache wherein said data cache comprises a plurality of tracks, wherein each track comprises one or more segments, and wherein said data cache comprises a maximum number of segments that can be stored in said cache, the computer readable program code comprising a series of computer readable program steps to effect:
maintaining a first least recently used ("LRU") list comprising one or more first tracks having a low reuse potential;
maintaining a second LRU list comprising one or more second tracks having a high reuse potential;
setting a target size for said first LRU list;
accessing a track;
determining if said accessed track comprises a first track;
operative if said accessed track comprises a first track, increasing said target size for said first LRU list;
operative if said accessed track comprises a second track, decreasing said target size for said first LRU list.

16. The article of manufacture of claim 15, said computer readable program code further comprising a series of computer readable program steps to effect:
determining the actual size of said first LRU list;
retrieving a fixed_predetermined_number;
determining if the sum of the number of segments comprising said first LRU list and comprising said second LRU list exceed said fixed_predetermined_number;
determining if one or more tracks have been demoted from the cache;
operative if the sum of the number of segments in said first LRU list and said second LRU list exceed said fixed_predetermined_number, and operative if one or more tracks have not been demoted from the cache, setting said target size of said first list to the number of segments comprising said first LRU list;
operative if the sum of the number of segments comprising said first LRU list and comprising said second LRU list exceed said fixed_predetermined_number, electing to demote one or more tracks from said cache;
determining if said actual size of said first LRU list is greater than said target size of said first LRU list;
operative if electing to demote one or more tracks from said cache and operative if said actual size of said first LRU list is greater than said target size of said first LRU list, demoting one or more tracks from said first LRU list;
operative if electing to demote one or more tracks from said cache and operative if said actual size of said first LRU list is not greater than said first LRU list target size, demoting one or more tracks from said second LRU list.

17. The article of manufacture of claim 16, said computer readable program code further comprising a series of computer readable program steps to effect setting said fixed_predetermined_number equal to about 90 percent of said maximum number of segments.

18. The article of manufacture of claim 16, said computer readable program code further comprising a series of computer readable program steps to effect:
associating a first sequence number to each of said first tracks, wherein each such first sequence number is based upon the time the associated first track was last accessed, wherein the least recently accessed first track is associated with the smallest first sequence number lru_first_sequenceNbr, and wherein the most recently accessed first track is associated with the largest first sequence number mru_first_sequenceNbr;

associating a second sequence number to each of said second tracks, wherein each such second sequence number is based upon the time the associated second track was last accessed, wherein the least recently accessed second track is associated with the smallest second sequence number lru_second_sequenceNbr, and wherein the most recently accessed second track is associated with the largest second sequence number mru_second_sequenceNbr.

19. The article of manufacture of claim 18, said computer readable program code further comprising a series of computer readable program steps to effect:

defining a bottom portion of said first LRU list and a top portion of said first LRU list, wherein each first track comprising said bottom portion of said first LRU list is associated with a first sequence number less than the first sequence number associated with each first track comprising said top portion of said first LRU list;

operative if said actual size of said first LRU list is greater than said target size of said first LRU list, demoting one or more first tracks from said bottom portion of said first LRU list.

20. The article of manufacture of claim 19, said computer readable program code further comprising a series of computer readable program steps to effect setting said bottom portion of said first LRU list to comprise the number of segments equal to about 2 percent of said maximum number of segments.

21. The article of manufacture of claim 19, said computer readable program code further comprising a series of computer readable program steps to effect:

defining a bottom portion of said second LRU list and a top portion of said second LRU list, wherein each second track comprising said bottom portion of said second LRU list is associated with a second sequence number less than the second sequence number associated with each second track comprising said top portion of said second LRU list;

operative if said actual size of said first LRU list is not greater than said target size of said first LRU list, demoting one or more second tracks from said bottom portion of said second LRU list.

22. The article of manufacture of claim 21, said computer readable program code further comprising a series of computer readable program steps to effect setting said bottom portion of said second LRU list to comprise the number of segments equal to about 2 percent of said maximum number of segments.

23. The article of manufacture of claim 21, said computer readable program code further comprising a series of computer readable program steps to effect:

establishing a direction parameter with a value of 0;

operative if a track comprising said bottom portion of said first LRU list is accessed, setting said direction parameter to equal +1;

operative if a track comprising said bottom portion of said second LRU list is accessed, setting said direction parameter to equal −1;

demoting a track from said cache;

determining the number of segments comprising said demoted track;

forming an adjustment number comprising the multiplication product of said direction parameter and the number of segments comprising the demoted track;

adjusting said target size of said first LRU list to equal said target size plus said adjustment number.

24. The article of manufacture of claim 23, wherein said setting a direction parameter step further comprises the steps of:

establishing a first_list_Size equal to the number of segments on said first LRU list;

establishing a first_sampling_region_size which is less than said maximum number of segments;

operative if said an accessed track comprises a first track, setting accessed_firsttrack_sequenceNbr to equal the sequence number associated with the accessed first track;

operative if (accessed_firstrack_sequenceNBR−lru_first_sequenceNbr)≦(first_sampling_region_size/first_ list_Size)×(mru_first_sequenceNbr−lru_first_sequenceNbr), setting said direction parameter to equal +1.

25. The article of manufacture of claim 24, said computer readable program code further comprising a series of computer readable program steps to effect:

setting cacheSize equal to said maximum number of segments;

setting said first_sampling_region_size equal to cacheSize/50.

26. The article of manufacture of claim 22, said computer readable program code further comprising a series of computer readable program steps to effect:

establishing a second_list_Size equal to the number of segments on said second LRU list;

setting a second_sampling_region_size to a value less than said maximum number of segments;

operative if said an accessed track comprises a second track, determining the second sequence number associated with that accessed second track;

setting accessed_secondtrack_sequenceNbr to equal the sequence number associated with the accessed second track;

operative if (accessed_secondrack_sequenceNBR−lru_second_sequenceNbr)≦(second_sampling_region_size/second_list_Size)×(mru_second_sequenceNbr−lru_second_sequenceNbr), setting said direction parameter to equal −1.

27. The article of manufacture of claim 26, said computer readable program code further comprising a series of computer readable program steps to effect:

setting cacheSize equal to said maximum number of segments;

setting said second_sampling_region_size equal to cacheSize/50.

28. The article of manufacture of claim 26, said computer readable program code further comprising a series of computer readable program steps to effect setting said first_sampling_region_size equal to said second_sampling_region_size.

29. A computer program product usable with a programmable computer processor to manage data in a data cache wherein said data cache comprises a plurality of tracks, wherein each track comprises one or more segments, comprising:

computer readable program code which causes said programmable computer processor to maintain a first LRU list comprising one or more first tracks having a low reuse potential;

computer readable program code which causes said programmable computer processor to maintain a second LRU list comprising one or more second tracks having a high reuse potential;

computer readable program code which causes said programmable computer processor to set a target size for said first LRU list;

computer readable program code which causes said programmable computer processor to access a track;

computer readable program code which causes said programmable computer processor to determine if said accessed track comprises a first track;

computer readable program code which, if said accessed track comprises a first track, causes said programmable computer processor to increase said target size for said first LRU list;

computer readable program code which, if said accessed track comprises a second track, causes said programmable computer processor to decrease said target size for said first LRU list.

30. The computer program product of claim 29, further comprising:

computer readable program code which causes said programmable computer processor to determine the actual size of said first LRU list;

computer readable program code which causes said programmable computer processor to provide a fixed_predetermined_number;

computer readable program code which causes said programmable computer processor to determine if the sum of the number of segments comprising said first LRU list and comprising said second LRU list exceed said fixed_predetermined_number;

computer readable program code which causes said programmable computer processor to determine if one or more tracks have been demoted from the cache;

computer readable program code which, if the sum of the number of segments in comprising said first LRU list and comprising said second LRU list exceed said fixed_predetermined_number and if one or more tracks have not been demoted from the cache, causes said programmable computer processor to set said target size of said first list to the number of segments comprising said first LRU list;

computer readable program code which, if the sum of the number of segments comprising said first LRU list and comprising said second LRU list exceed said fixed_predetermined_number, causes said programmable computer processor to elect to demote one or more tracks from said cache;

computer readable program code which causes said programmable computer processor to determine if said actual size of said first LRU list is greater than said target size of said first LRU list;

computer readable program code which, if electing to demote one or more tracks from said cache and if said actual size of said first LRU list is greater than said target size of said first LRU list, causes said programmable computer processor to demote one or more tracks from said first LRU list;

computer readable program code which, if electing to demote one or more tracks from said cache and if said actual size of said first LRU list is not greater than said first LRU list target size, causes said programmable computer processor to demote one or more tracks from said second LRU list.

31. The computer program product of claim 30, further comprising computer readable program code which causes said programmable computer processor to set said fixed_predetermined_number equal to about 90 percent of said maximum number of segments.

32. The computer program product of claim 31, further comprising:

computer readable program code which causes said programmable computer processor to associate a first sequence number to each of said first tracks, wherein each such first sequence number is based upon the time the associated first track was last accessed, wherein the least recently accessed first track is associated with the smallest first sequence number lru_first_sequenceNbr, and wherein the most recently accessed first track is associated with the largest first sequence number mru_first_sequenceNbr;

computer readable program code which causes said programmable computer processor to associate a second sequence number to each of said second tracks, wherein each such second sequence number is based upon the time the associated second track was last accessed, wherein the least recently accessed second track is associated with the smallest second sequence number lru_second_sequenceNbr, and wherein the most recently accessed second track is associated with the largest second sequence number mru_second_sequenceNbr.

33. The computer program product of claim 32, further comprising:

computer readable program code which causes said programmable computer processor to define a bottom portion of said first LRU list and a top portion of said first LRU list, wherein each first track comprising said bottom portion of said first LRU list is associated with a first sequence number less than the first sequence number associated with each first track comprising said top portion of said first LRU list;

computer readable program code which, if said actual size of said first LRU list is greater than said target size of said first LRU list, causes said programmable computer processor to demote one or more first tracks from said bottom portion of said first LRU list.

34. The computer program product of claim 33, further comprising computer readable program code which causes said programmable computer processor to set said bottom portion of said first LRU list to the number of segments equal to about 2 percent of said maximum number of segments.

35. The computer program product of claim 33, further comprising:

computer readable program code which causes said programmable computer processor to define a bottom portion of said second LRU list and a top portion of said second LRU list, wherein each second track comprising said bottom portion of said second LRU list is associated with a second sequence number less than the second sequence number associated with each second track comprising said top portion of said second LRU list;

computer readable program code which, if said actual size of said first LRU list is not greater than said target size of said first LRU list, causes said programmable computer processor to demote one or more second tracks from said bottom portion of said second LRU list.

36. The computer program product of claim 35, further comprising computer readable program code which causes said programmable computer processor to set said bottom portion of said second LRU list to the number of segments equal to about 2 percent of said maximum number of segments.

37. The computer program product of claim 32, further comprising:
   computer readable program code which causes said programmable computer processor to establish a direction parameter with a value of 0;
   computer readable program code which, if a track comprising said bottom portion of said first LRU list is accessed, causes said programmable computer processor to set said direction parameter to equal +1;
   computer readable program code which, if a track comprising said bottom portion of said second LRU list is accessed, causes said programmable computer processor to set said direction parameter to equal −1;
   computer readable program code which causes said programmable computer processor to demote a track from said cache;
   computer readable program code which causes said programmable computer processor to determine the number of segments comprising said demoted track;
   computer readable program code which causes said programmable computer processor to form an adjustment number comprising the multiplication product of said direction parameter and the number of segments comprising the demoted track;
   computer readable program code which causes said programmable computer processor to adjust said target size of said first LRU list to equal said target size plus said adjustment number.

38. The computer program product of claim 37, further comprising:
   computer readable program code which causes said programmable computer processor to establish a first_list_Size equal to the number of segments on said first LRU list;
   computer readable program code which causes said programmable computer processor to establish a first_sampling_region_size which is less than said maximum number of segments;
   computer readable program code which, if said an accessed track comprises a first track, causes said programmable computer processor to set accessed_firsttrack_sequenceNbr to equal the sequence number associated with the accessed first track;
   computer readable program code which, if (accessed_firstrack_sequenceNBR−lru_first_sequenceNbr)≦(first_sampling_region_size/first_list_Size)×(mru_first_sequenceNbr−lru_first_sequenceNbr), causes said programmable computer processor to set said direction parameter to equal+1.

39. The computer program product of claim 38, further comprising:
   computer readable program code which causes said programmable computer processor to set cacheSize equal to said maximum number of segments;
   computer readable program code which causes said programmable computer processor to set said first_sampling_region_size equal to cacheSize/50.

40. The computer program product of claim 38, further comprising:
   computer readable program code which causes said programmable computer processor to establish a second_list_Size equal to the number of segments on said second LRU list;
   computer readable program code which causes said programmable computer processor to establish a second_sampling_region_size which is less said maximum number of segments;
   computer readable program code which, if an accessed track comprises a second track, causes said programmable computer processor to determine the second sequence number associated with that accessed second track;
   computer readable program code which causes said programmable computer processor to set accessed_secondtrack_sequenceNbr to equal the sequence number associated with the accessed second track,
   computer readable program code which, if (accessed_secondrack_sequenceNBR−lru_second_sequenceNbr)≦(second_sampling_region_size/second_list_Size)×(mru_second_sequenceNbr−lru_second_sequenceNbr), causes said programmable computer processor to set said direction parameter to equal −1.

41. The computer program product of claim 40, further comprising:
   computer readable program code which causes said programmable computer processor to set cacheSize equal to said maximum number of segments;
   computer readable program code which causes said programmable computer processor to set said second_sampling_region_size equal to cacheSize/50.

42. The computer program product of claim 40, further comprising computer readable program code which causes said programmable computer processor to set said first_sampling_region_size equal to said second_sampling_region_size.

* * * * *